(12) United States Patent
Gong et al.

(10) Patent No.: US 9,870,257 B1
(45) Date of Patent: Jan. 16, 2018

(54) AUTOMATION OPTIMIZATION IN A COMMAND LINE INTERFACE

(71) Applicant: VCE Company, LLC, Richardson, TX (US)

(72) Inventors: Changbin Gong, Sherborn, MA (US); Srinivas Mantrala, Morrisville, NC (US)

(73) Assignee: VCE Company, LLC, Richardson, TX (US)

( * ) Notice: Subject to any disclaimer, the term of this patent is extended or adjusted under 35 U.S.C. 154(b) by 0 days.

(21) Appl. No.: 14/536,447

(22) Filed: Nov. 7, 2014

(51) Int. Cl.
| | |
|---|---|
| *G06F 9/45* | (2006.01) |
| *G06F 9/48* | (2006.01) |
| *G06F 9/445* | (2006.01) |
| *G06F 9/44* | (2006.01) |

(52) U.S. Cl.
CPC ........ *G06F 9/4881* (2013.01); *G06F 9/44505* (2013.01); *G06F 8/314* (2013.01); *G06F 8/45* (2013.01); *G06F 8/71* (2013.01)

(58) Field of Classification Search
CPC ..... G06F 8/10; G06F 8/20; G06F 8/45; G06F 8/71; G06F 8/314; G06F 8/456
See application file for complete search history.

(56) References Cited

U.S. PATENT DOCUMENTS

| | | | | |
|---|---|---|---|---|
| 6,915,507 B1* | 7/2005 | Kaler | ................. | A61M 5/1689 717/103 |
| 7,519,964 B1* | 4/2009 | Islam | ....................... | G06F 8/44 717/177 |
| 7,810,041 B2* | 10/2010 | Rao et al. | ..................... | 715/771 |
| 8,943,203 B1* | 1/2015 | Lent | .................. | G06F 17/30197 709/203 |
| 9,268,608 B2* | 2/2016 | LaForest | | |
| 2003/0115305 A1* | 6/2003 | Murray et al. | ................ | 709/222 |
| 2005/0165802 A1* | 7/2005 | Sethi | ................... | G06F 17/3056 |
| 2006/0294526 A1* | 12/2006 | Hambrick | ................ | G06F 8/20 719/315 |
| 2009/0193427 A1* | 7/2009 | Pu | ........................ | G06F 9/5072 718/104 |
| 2010/0024031 A1* | 1/2010 | Shribman | .......... | G06F 9/45512 726/18 |

(Continued)

OTHER PUBLICATIONS

Murillo et al., "Enhancing Interfaces for Network Security Administrators with Legacy Attributes", ACM, CLIHC'15, Nov. 2015, pp. 1-8; <http://dl.acm.org/citation.cfm?id=2824896 &CFID=968133826&CFTOKEN=57638951>.*

(Continued)

*Primary Examiner* — Thuy Dao
*Assistant Examiner* — Ben C Wang
(74) *Attorney, Agent, or Firm* — Womble Bond Dickinson (US) LLP; Jeffrey R. McFadden

(57) ABSTRACT

A method of automation optimization in a command line interface is provided. The method includes receiving a configuration input that includes one or more commands and parsing the configuration input. The method also includes generating a command list that includes one or more tasks, based on the configuration input and populating a queue with the one or more tasks. The method includes executing each of the one or more tasks from the queue, on a command line interface and outputting a result, based on the executing.

16 Claims, 4 Drawing Sheets

(56) References Cited

U.S. PATENT DOCUMENTS

| | | | | |
|---|---|---|---|---|
| 2010/0217849 | A1* | 8/2010 | LaForest | G06F 9/5016 709/222 |
| 2011/0055310 | A1* | 3/2011 | Shavlik | G06F 8/65 709/202 |
| 2011/0225565 | A1* | 9/2011 | van Velzen | G06F 9/5038 717/114 |
| 2013/0325899 | A1* | 12/2013 | Mohaban | G06Q 10/10 707/791 |
| 2013/0326029 | A1* | 12/2013 | Flynn | H04L 41/0803 709/220 |
| 2014/0032729 | A1* | 1/2014 | Chiu | H04L 67/00 709/223 |
| 2014/0282495 | A1* | 9/2014 | Chico De Guzman Huerta | G06F 8/61 717/177 |
| 2014/0325473 | A1* | 10/2014 | Tu | G06F 8/34 717/106 |
| 2015/0324216 | A1* | 11/2015 | Sizemore | G06F 9/45558 718/1 |
| 2016/0062738 | A1* | 3/2016 | Mai | G06F 8/34 717/101 |
| 2016/0124718 | A1* | 5/2016 | Denise | G06F 9/45558 717/104 |
| 2017/0228389 | A1* | 8/2017 | Mohaban | G06F 17/30106 |

OTHER PUBLICATIONS

Wu et al., "Integrating SNMP Agents and CLI with NETCONF-Based Network Management Systems", IEEE, Sep. 2010, pp. 81-84; <http://ieeexplore.ieee.org/stamp/stamp.jsp?tp=&arnumber=5563913>.*

Weaver et al., "XUTools: Unix Commands for Processing Next-Generation Structured Text", USENIX Association, LIAS'12, Dec. 2012, pp. 83-99; <http://www.cs.dartmouth.edu/~sws/pubs/ws12.pdf>.*

* cited by examiner

AUTOMATION OPTIMIZATION IN A COMMAND LINE INTERFACE

BACKGROUND

In a computing system, a command line interface (CLI) accepts commands from a user. Typically, the user enters a command via a keyboard or other human interface device, and waits until the command line interface indicates completion of the command. Then, the user can enter another command. This sequential processing can be time consuming. Alternatively, the user can write a script, which automates the command line interface to a degree. This requires the user have programming expertise in script writing for a particular operating system, as scripts are generally not portable across different operating systems and are thus not platform-independent. In addition, the process of writing a script is time-consuming and may involve debugging to detect errors in the scripts.

SUMMARY

Embodiments of a method, device and system are provided. In some embodiments, a method of automation optimization in a command line interface is provided. The method includes receiving a configuration input that includes one or more commands and parsing the configuration input. The method also includes generating a command list that includes one or more tasks, based on the configuration input and populating a queue with the one or more tasks. The method includes executing each of the one or more tasks from the queue, on a command line interface and outputting a result, based on the executing.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A command line interface (CLI) package described herein has a command parser module, a command processor module, and a command output module which cooperate to optimize automation in a command line interface. These components parse a configuration input, such as a configuration file, determine tasks for execution in parallel and/or serial manner or combinations thereof, and execute the tasks on the command line interface accordingly. Parameter passing, execution by priority, progress monitoring, subsequent task initiation based on current task progress, and result formatting are also performed in various embodiments. The command line interface package thereby automates user interactions with the command line interface, without requiring the user to write a script.

Figure 1:
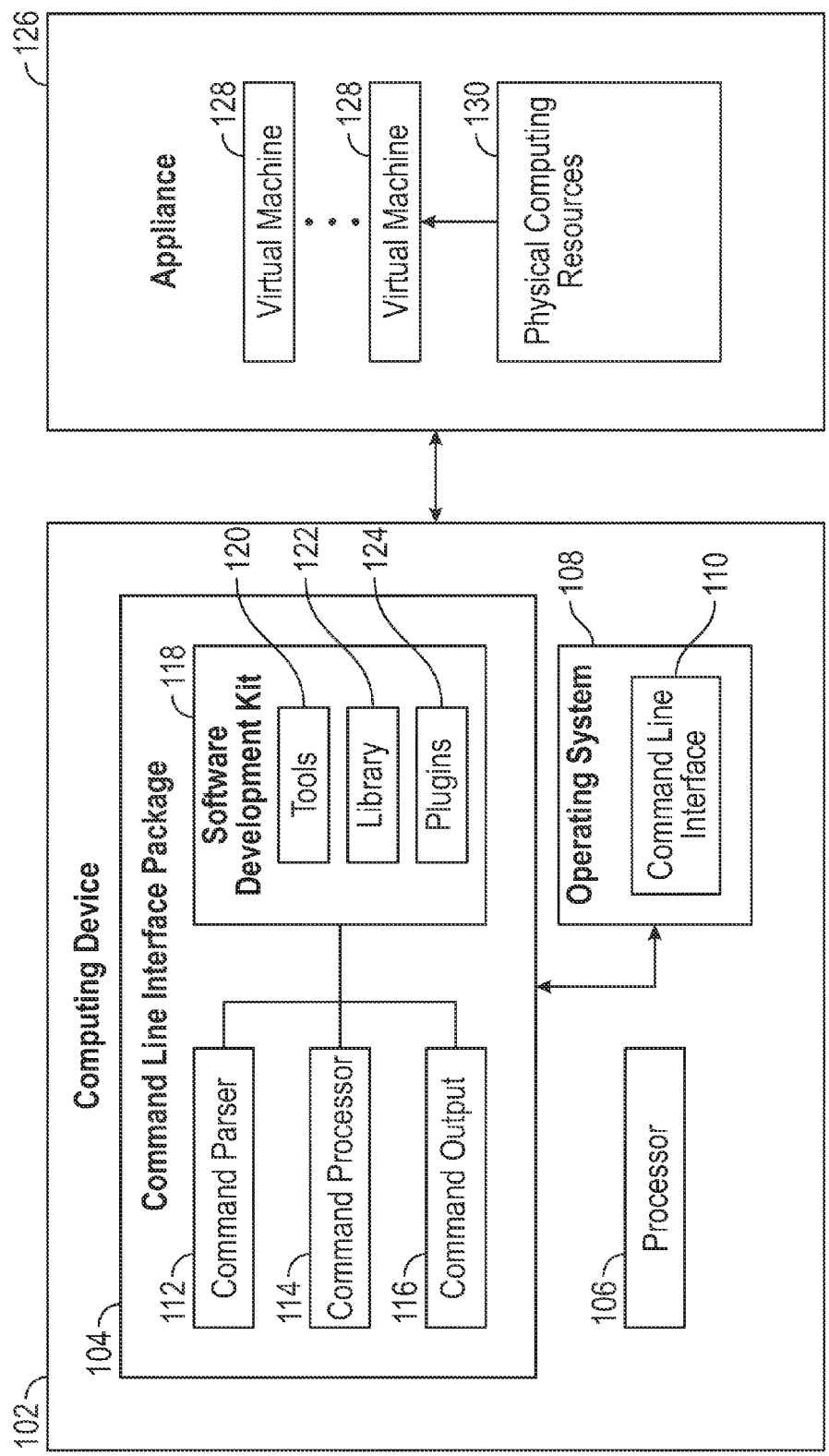
FIG. 1 is a system diagram showing components of a command line interface package interacting with a command line interface in a computing device, and interacting with an appliance for virtual machines in some embodiments.

FIG. 1 is a system diagram showing components of a command line interface package 104 interacting with a command line interface 110 in a computing device 102, and interacting with an appliance 126 for virtual machines 128. The command line interface package 104 is applicable to various computing environments having various operating systems and various computing resources, including physical machines and/or virtual machines 128. In the example shown, the virtual machines 128 are implemented from physical computing resources 130 in or associated with an appliance 126, such as the Vblock® system of the assignee. An operating system 108 in the computing device 102 has a command line interface 110. A processor 106, which could include one or more processors, in the computing device 102 executes instructions from various sources such as the operating system 108, the software development kit 118, and the modules 112, 114, 116 of the command line interface 110. The command parser module 112, the command processor module 114 and/or the command output module 116 could be implemented in hardware, firmware, software, or combinations thereof. The software development kit 118 includes tools 120, a library 122 of functions, and/or plug-ins 124. Tasks managed by the command line interface package 104 and executed on the command line interface 110 can be directed towards or make use of portions of the software development kit 118, portions of the operating system 108, or other functions, tools, etc., available to the computing device 102.

The command parser module 112 of FIG. 1 determines tasks to be performed, based on user input. The command processor module 114 manages the tasks, and executes the tasks on the command line interface 110. Results from the tasks managed by the command line interface package 104 can be directed to a user (as will be shown in FIG. 4) or can be directed to a physical machine or a virtual machine 128, and are formatted accordingly by the command output module 116.

Figure 2:
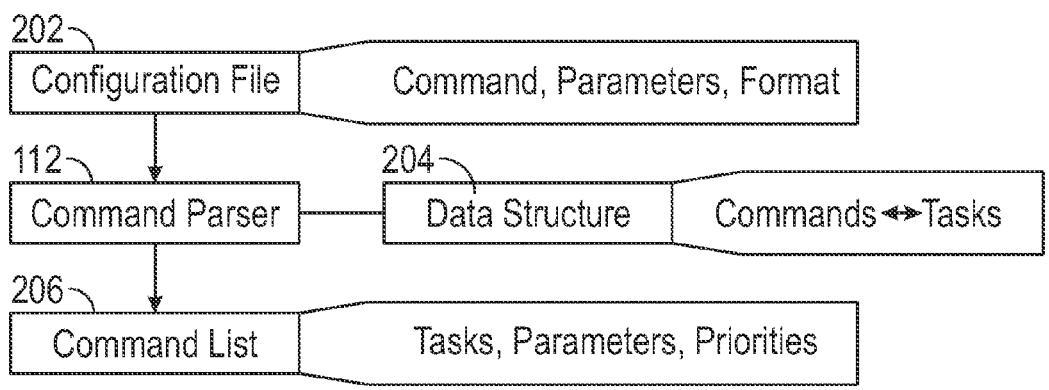
FIG. 2 depicts a command parser module, one of the components of the command line interface package, producing a command list based on a configuration input in some embodiments.

FIG. 2 depicts one of the components of the command line interface package 104, a command parser module 112, producing a command list 206 based on a configuration input 202. The configuration input 202 can be a configuration file as depicted in the example in FIG. 2, or could be another form of input such as direct user entry, e.g., via a keyboard or other input device. The configuration input 202 includes one or more commands, and may include one or more parameters associated with the commands. In some embodiments, the format to be applied by the command output module 116 is predetermined. In some embodiments, this format is supplied or indicated in the configuration input 202. For example, the configuration input 202 could be a file specifying what the user wants to achieve, such as uploading a file, deleting a file, assigning permission or user access to a file, creating a user, assigning a role to a user, etc., with output to be formatted for use in a spreadsheet or other specified software, database or data structure.

The command parser module 112 receives the configuration input 202, and parses the contents. In the embodiment shown in FIG. 2, the command parser module 112 is coupled to a data structure 204 that indicates association of commands and tasks. For example, the data structure 204 could show that a specified command can be performed by executing one or more specified tasks. Generally, the user should be provided with information about which commands are applicable, and which parameters and ranges of parameter values should be supplied along with the command or commands in the configuration input 202. The data structure 204 could include one or more tables, lists, or other arrangements of information indicating correspondence between tasks suitable for the command list 206 and commands suitable for the configuration input 202. By consulting the data structure 204, the command parser module 112 determines which command or commands are in the configuration input 202, which parameters are in the configuration input 202, and which tasks should be performed in accordance with the command or commands in the configuration input 202. The command parser module 112 further determines priorities for the tasks, for example by determining which tasks rely on information obtained by performing other tasks. With this information, the command parser module 112 generates the command list 206, which then has a list of tasks, parameters, and priorities for the tasks, in various combinations in various embodiments.

Figure 3:
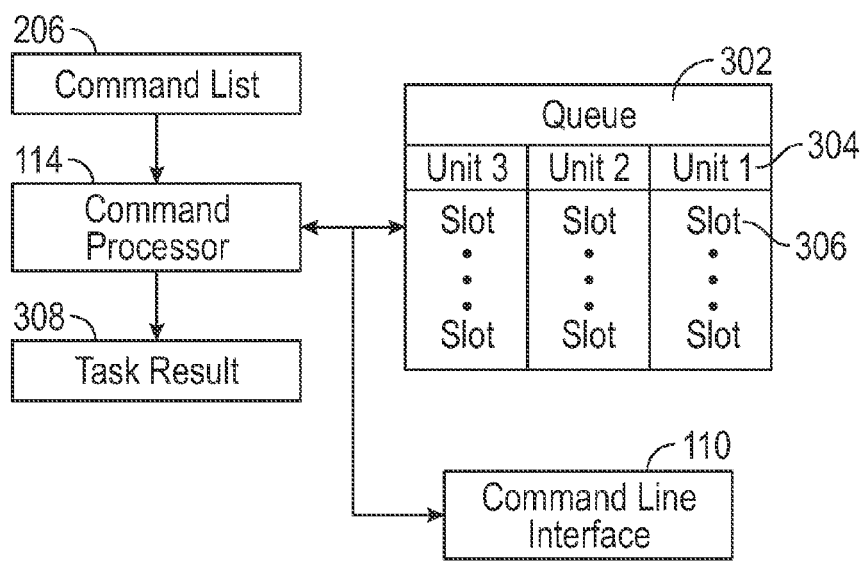
FIG. 3 depicts a command processor module, one of the components of the command line interface package, populating a queue and executing tasks from the queue on the command line interface in some embodiments.

FIG. 3 depicts one of the components of the command line interface package 104, namely command processor module 114, populating a queue 302 and executing tasks from the queue 302 on the command line interface 110. Various types of queues 302 are used in various embodiments. For example, the queue 302 could include a software queue, a hardware queue, a FIFO (first in first out) queue, a LIFO (last in first out) queue, a parallel in serial out queue, a circular buffer and so on. In some embodiments, queue 302 indicates which tasks are to be executed in parallel and which tasks are to be executed in sequence. In the embodiment shown, the queue 302 has a plurality of units 304. Each of the units 304 executes in sequence, for example UNIT1 executes first, then UNIT2, followed by UNIT3. Each of the units 304 has a plurality of slots 306. All of the slots 306 in a specified unit 304 execute in parallel in some embodiments. Each of the slots 306 can receive a task, from the command processor module 114, as the command processor module 114 populates the queue 302. The queue 302 can then output tasks from the slots 306, providing the tasks directly to the command line interface 110. Alternatively, the queue 302 can provide the tasks to the command processor module 114 so that the command processor module 114 can send the tasks to the command line interface 110. In other words, tasks in the slots 306 in a given unit 304 execute in parallel, while tasks in differing units 304 execute in sequence. As an operating example, two tasks in slots 306 in a first unit 304, e.g., UNIT1, would operate in parallel, followed in sequence by one or more tasks in slots 306 in a second unit 304, e.g., UNIT2. Alternatively, one slot in a first unit 304 would operate, followed in sequence by two or more tasks in slots 306 in the second unit 304 operating in parallel with each other. Various further examples are readily devised.

Still referring to FIG. 3, the command processor module 114 receives the command list 206 from the command parser module 112, and determines which tasks from the command list 206 can be executed in parallel, and which tasks execute in sequence. This can be based on priorities explicitly specified in the command list 206 and/or can be determined by the command processor module 114 based on parameter dependencies among the tasks. For example, the command processor module 114 can determine which tasks depend on parameters from other tasks, and which tasks can be executed independently and are thus candidates for parallel execution on the command line interface 110. Based on these determinations, the command processor module 114 populates the queue 302. Tasks that can be performed in parallel with one another are placed in slots in the same unit 304. Tasks that have dependencies on parameters from other tasks are arranged in differing units 304 accordingly. The command processor module 114, after populating the queue 302, selects tasks from the queue 302 and executes the tasks on the command line interface 110. This action could be performed, for example, using multithreading in which multiple threads are initiated for tasks that can be executed in parallel, i.e., tasks in slots 306 in the same unit 304. The command processor module 114 monitors progress of the tasks, for example using feedback from the command line interface 110. When tasks from one unit 304 are complete, the command processor module 114 then initiates the task or tasks in the next unit 304 from the queue 302, for example by reading the tasks from the slots 306 in the queue 302 and executing tasks on the command line interface 110. The command processor module 114 performs parameter passing, for example by receiving one or more parameters from the command line interface 110 upon completion of a task, and binding or passing the one or more parameters to the appropriate task that makes use of the parameter(s). This can be performed prior to placement of a task into the queue 302, or can be performed in the queue 302, e.g., in a queue that permits parallel loading. In some embodiments, the queue 302 can perform self-unloading to the command line interface 110, so that the command processor module 114 can populate the queue 302 while the queue is providing one or more tasks to the command line interface 110. In some embodiments, the command processor module 114 monitors progress of the tasks during execution on the command line interface 110 and schedules sequential and parallel tasks in accordance with the progress. Some or all of the tasks produce a result or results. The command processor module 114 passes a task result 308 to the command output module. Task result 308 could be in the form of one or more parameter values from the command line interface 110, and/or an indication of completion of one or more tasks in some embodiments.

Figure 4:
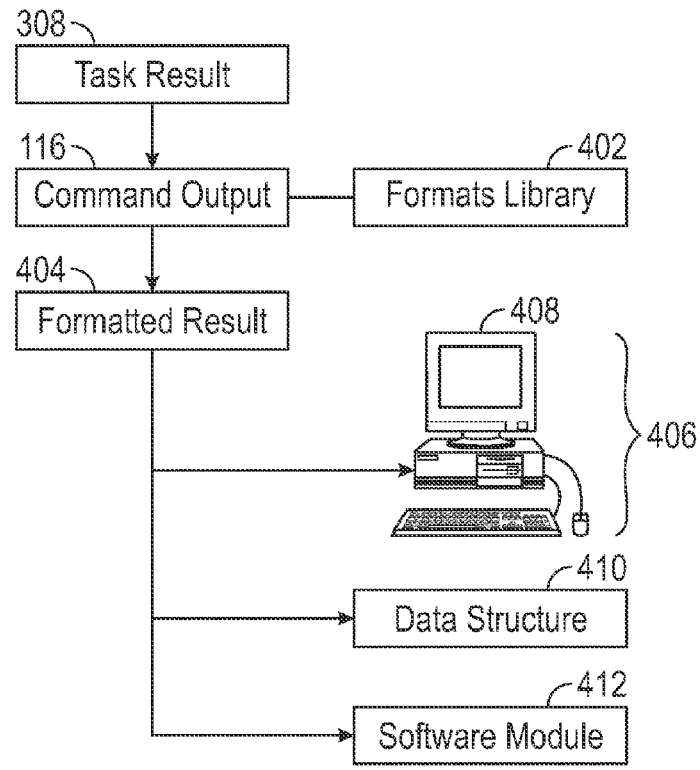
FIG. 4 depicts a command output module, one of the components of the command line interface package, formatting a task result for display or exporting to a data structure or a software module in some embodiments.

FIG. 4 depicts one of the components of the command line interface package 104, a command output module 116, formatting a task result 308 for display or exporting to a data structure 410 or a software module 412. In some embodiments, the command output module 116 formats according to a predetermined type of format. In some embodiments, the command output module 116 is coupled to a formats library 402, which has a set of formats applicable to formatting the task result 308. For example, the command output module 116 could produce a formatted result 404 that can be displayed on a display 408 of a computer 406, exported to a data structure 410 such as a spreadsheet or a database, or exported to a software module 412. The software module 412 could make use of the formatted result 404 in various ways, such as tracking user permissions, operating virtual machines, updating information, communicating with other software or hardware, etc.

With reference to FIGS. 1-4, the following example scenario illustrates operation and utility of the command line interface package 104. A system administrator may desire to establish user permission for a new user, so that the new user can access files, e.g., files representing virtual machines in a directory structure. The system administrator brings up a word processor or a text editor, and creates a configuration file with the user name and an appropriate request. For example, the configuration file could contain an instructional phrase such as "assign Joe virtual machines a, b, c in directory company name/website machines". The command parser module 112 could recognize the phrase "assign" is followed by a parameter that is a user name, the phrase "virtual machines" is followed by one or more parameters that are the names of virtual machines 128 (see FIG. 1), and the phrase "directory" is followed by one or more parameters that specify locations of files in a directory structure. The command parser module 112 consults the data structure 204, and breaks down the command "assign" in this context to a series of tasks. These tasks may include a first task, e.g., create a permission, a second task, e.g., create a role or a rule, a third task, e.g., create a user, and a fourth task, e.g., assign the user to the role or rule. In this example, the first, second and third tasks could be performed in parallel, and would thus be assigned equal and relatively high priorities. The fourth task should be performed after the first three tasks, and would thus be assigned a lower priority. The command parser module 112 would then pass this information, in the command list 206, to the command processor module 114. Receiving the command list 206, the command processor module 114 next places the first three tasks in three slots 306 in the first unit 304 of the queue 302, and places the fourth task in a slot 306 in a second unit 304 in the queue 302. The decision of where to place the tasks is based on the priorities indicated in the command list 206 or based on parameter dependencies and parameter passing among the tasks in some embodiments. Other sequences and examples of parallelism or series execution are readily devised as the example is not meant to be limiting.

Still referring to FIGS. 1-4, the command processor module 114 then executes the first three tasks from the queue 302, by reading all of the slots 306 in the first unit 304 (or, just reading the populated slots 306). The command processor module 114 sends these tasks to the command line interface 110 in parallel, for example by initiating multiple threads each of which executes a task on the command line interface 110. When the command processor module 114 determines that the first three tasks have completed execution, e.g., by receiving feedback to that effect from the command line interface 110, the command processor module 114 obtains one or more parameters and passes these to the fourth task. The command processor module 114 reads the fourth task from the next unit 304 in the queue, and executes that task on the command line interface 110, with appropriate parameters. Results of execution are gathered by the command processor module 114, such as indication of completion, confirmation, or any error messages (e.g., absence of a requested directory, file or virtual machine for permission assignment). These results are placed into the task result 308, which could be a file or a message. The command processor module 114 sends the task result 308 to the command output module 116. In embodiments where multiple formats are available for use by the command output module 116, the configuration file could specify a format, such as formatting for use in a spreadsheet. This could be accomplished with the use of a keyword such as "spreadsheet", "data structure", or the name of a software module 412 or location of a data structure 410. The command parser module 112 could forward this information in the command list 206, and the command processor module 114 could further forward this information in a task result 308 to the command output module 116. Upon receiving the task result 308, the command output module 116 takes the various parameters and formats them accordingly to produce the formatted result 404. In this example, the formatted result 404 could be a summary of the virtual machines 128 assigned to the user, and the locations of the virtual machines 128 in the directory structure. This summary would be formatted for export to a spreadsheet, i.e., the user of the spreadsheet could import the information directly, as the formatted result 404 could be in the form of a compatible file.

Figure 5:
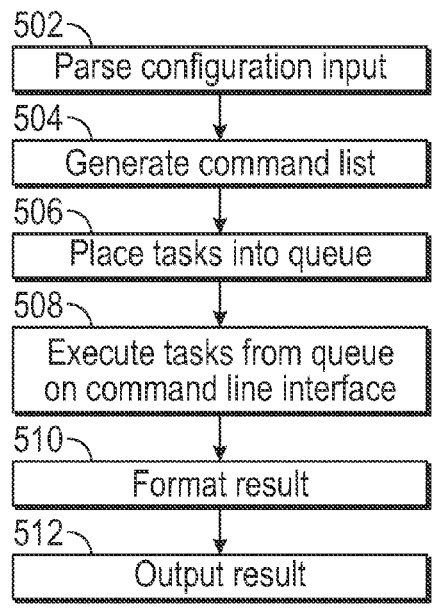
FIG. 5 is a flow diagram of a method for automation optimization in a command line interface, which can be practiced on or by the system depicted in FIGS. 1-4 in some embodiments.

FIG. 5 is a flow diagram of a method for automation optimization in a command line interface, which can be practiced on or by the system depicted in FIGS. 1-4. The method can be performed by a processor in a computing device such as a server or a network appliance. In order to initiate the method, the user creates a configuration input, such as a configuration file or live input from the keyboard or other input device. In an action 502, the configuration input is parsed. This can be performed, for example, by a command parser module. The parsing can determine, from the configuration input, one or more commands, one or more parameters applicable to the command or commands, and/or one or more formats applicable to a result, in various combinations and embodiments.

A command list is generated, based on the configuration input, in an action 504. The command list can be generated by the command parser module. In some embodiments, the command parser consults a data structure in order to generate the command list. The command list includes one or more tasks, and any applicable parameters, and is based on the configuration input in some embodiments. In embodiments where there are multiple formats from which to choose, the command list indicates a format. In some embodiments, the command list indicates priorities for the tasks, so that tasks can be sorted as to sequence and parallelism. In some embodiments, the command list does not indicate such priorities, and the command processor module can sort tasks as to sequence and parallelism based on parameter dependencies and parameter passing requirements among the tasks.

Tasks are placed into a queue, in an action 506. In some embodiments, the queue has multiple units for serial execution of tasks and each unit has multiple slots for parallel execution of tasks, and tasks are allocated accordingly. Management and population of the queue can be performed by the command processor module. The command processor module can determine which tasks can be executed in parallel and which tasks have dependencies on other tasks and should execute in series, based on information in the command list from the command parser module and/or based on parameter management as discussed above. Tasks from the queue are executed on a command line interface, in an action 508. Tasks are executed in sequence, based on location in the queue, such as in multiple units in the queue. Tasks are executed in parallel, based on location in the queue, such as in multiple slots in a unit in the queue. A combination of parallel and sequential execution of tasks optimizes the automation in the command line interface. A result of executing the tasks is formatted, in an action 510. The result could be formatted according to a single format, in some embodiments, or according to a selected format indicated in the configuration input and accessed in a formats library, in various embodiments. The result is output, in an action 512. In various embodiments, the formatted result can be displayed on a display or exported to a database or further software.

Figure 6:
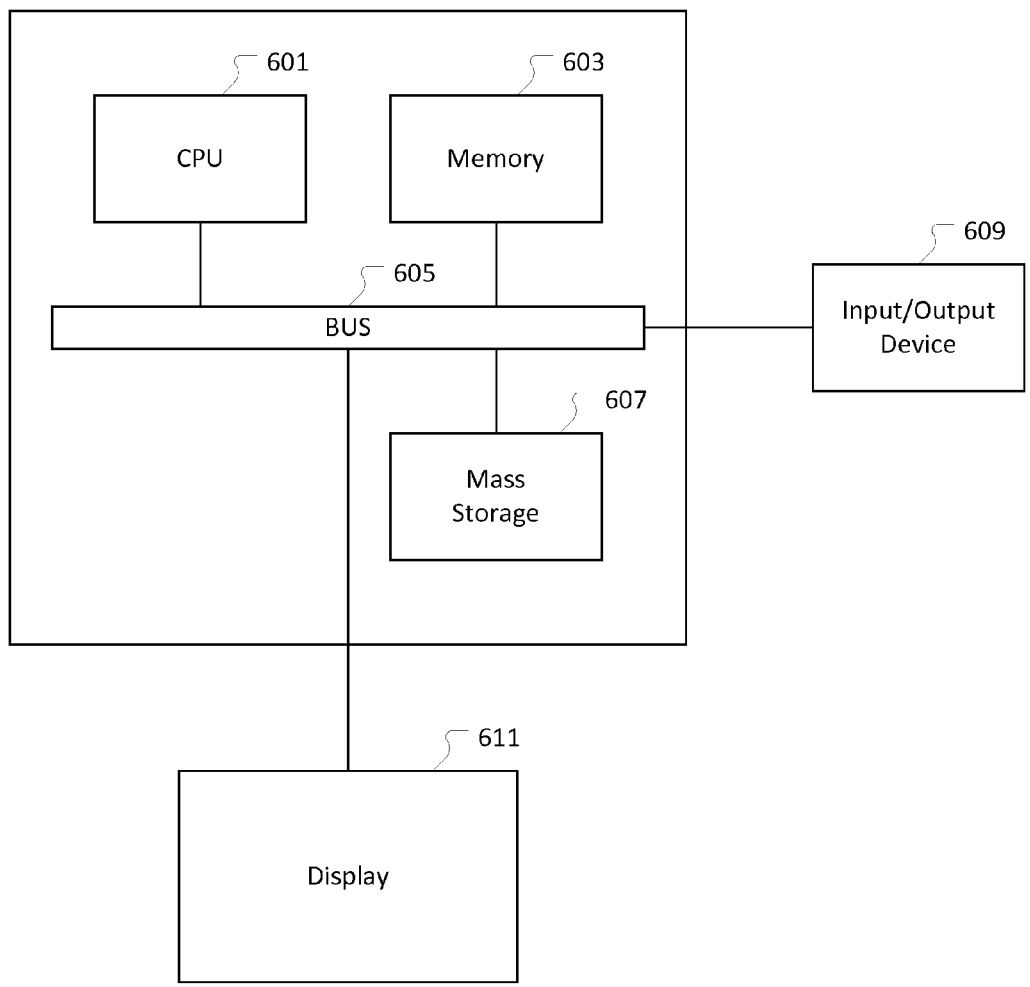
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for automation optimization in a command line interface in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of automation optimization in a command line interface, comprising:
    receiving a configuration input that includes one or more commands to an operating system for an appliance comprising one or more virtual machines implemented by one or more physical machines;
    parsing the configuration input;
    generating a command list based on the configuration input;
    populating a queue, wherein populating the queue comprises placing each of one or more tasks, based on the command list, into the queue, with an indication of the one or more tasks that are executable in parallel and at least another task of the one or more tasks that is executable in sequence;
    executing each of the one or more tasks from the queue, through the command line interface by
        executing all of a first set of tasks in a first unit in the queue in parallel; and
        executing a task in a second unit in the queue, sequenced after the executing all of the first set of tasks in parallel;
    outputting a result, based on the executing; and
    formatting the result, wherein:
        the configuration input includes a file having an indication of format for the result;
        the formatting the result is based on the indication of the format; and
        the formatted result is compatible with one of displaying the formatted result on a viewscreen, exporting the formatted result into a data structure, exporting the formatted result into a software module, or using the formatted result in software,
    wherein the method is performed by a processor.

2. The method of claim 1, wherein executing each of the one or more tasks from the queue includes executing each of the one or more tasks in accordance with the indication.

3. The method of claim 1, wherein populating the queue further comprises:
    placing a plurality of tasks in one of a plurality of units in the queue, wherein all of the plurality of tasks in the one of the plurality of units are arranged to execute in parallel.

4. The method of claim 1, wherein the method further comprises:
    passing a parameter from a first task to a second task.

5. The method of claim 1, wherein executing each of the one or more tasks from the queue further comprises:
    monitoring a first task from a first unit of the queue for completion in response to executing the first task through the command line interface; and
    executing a second task from a second unit of the queue through the command line interface in response to determining the completion of the first task.

6. A tangible, non-transitory, computer-readable media having instructions thereupon which, when executed by a processor, cause the processor to perform a method comprising:
    receiving a configuration input that includes one or more commands to an operating system for an appliance comprising one or more virtual machines implemented by one or more physical machines;
    parsing the configuration input;
    generating a command list based on the configuration input;

populating a queue, wherein populating the queue comprises placing each of one or more tasks, based on the command list, into the queue, with an indication of the one or more tasks that are executable in parallel and at least another task in the one or more tasks that is executable in sequence;

executing each of the one or more tasks from the queue, through a command line interface by executing all of a first set of tasks in a first unit in the queue in parallel; and executing a task in a second unit in the queue, sequenced after the executing all of the first set of tasks in parallel;

outputting a result, based on the executing; and formatting the result, wherein:

the configuration input includes a file having an indication of format for the result;

the formatting the result is based on the indication of the format; and the formatted result is compatible with one of displaying the formatted result on a viewscreen, exporting the formatted result into a data structure, exporting the formatted result into a software module, or using the formatted result in software.

7. The computer-readable media of claim 6, wherein executing each of the one or more tasks from the queue includes executing each of the one or more tasks in accordance with the indication.

8. The computer-readable media of claim 6, wherein populating the queue further comprises:

placing a plurality of tasks in one of a plurality of units in the queue, wherein all of the plurality of tasks in the one of the plurality of units are arranged to execute in parallel.

9. The computer-readable media of claim 6, wherein the method further comprises:

passing a parameter from a first task to a second task.

10. The computer-readable media of claim 6, wherein executing each of the one or more tasks from the queue further comprises:

monitoring a first task from a first unit of the queue for completion in response to executing the first task through the command line interface; and executing a second task from a second unit of the queue through the command line interface in response to determining the completion of the first task.

11. A system for automation optimization in a command line interface, comprising:

a computing device having a hardware processor;

a queue, resident in the computing device and configured to receive and release tasks for execution on a command line interface to an operating system for an appliance comprising one or more virtual machines implemented by one or more physical machines;

a command parser module resident in the computing device, the command parser module configured to receive a configuration input that includes one or more commands, the command parser module configured to parse the configuration input and generate a command based on the configuration input;

a command processor module resident in the computing device, the command processor module configured to populate the queue, wherein populating the queue comprises placing each of one or more tasks, based on the command list, into the queue, with an indication of the one or more tasks that are executable in parallel and at least another task in the one or more tasks that is executable in sequence, execute each of the one or more tasks from the queue, through the command line interface, wherein all of a first set of tasks in a first unit in the queue are executed in parallel, and a task in a second unit in the queue is executed after executing all of the first set of tasks in parallel;

a command output module resident in the computing device, the command output module configured to output a result, based on execution of the tasks; and format the result, wherein:

the configuration input includes a file having an indication of format for the result;

the formatting the result is based on the indication of the format; and the formatted result is compatible with one of displaying the formatted result on a viewscreen, exporting the formatted result into a data structure, exporting the formatted result into a software module, or using the formatted result in software.

12. The system of claim 11, further comprising:

the queue having a plurality of units configured for execution in sequence, each unit of the plurality of units having a plurality of slots configured for execution in parallel, each of the plurality of slots configured to receive a task and provide the task for execution by the processor on the command line interface.

13. The system of claim 11, further comprising:

the command processor module configured to place a plurality of tasks in one of a plurality of units in the queue, wherein all of the plurality of tasks in the one of the plurality of units are arranged to execute in parallel.

14. The system of claim 11, further comprising:

the command processor module configured to pass a parameter from a first task to a second task.

15. The system of claim 11, further comprising:

the command processor module configured to monitor a first task from a first unit of the queue for completion in response to executing the first task through the command line interface and execute a second task from a second unit of the queue through the command line interface in response to determining the completion of the first task.

16. The system of claim 11, further comprising:

a formats library resident in the computing device and coupled to or included in the command output module, the formats library configured to include a plurality of formats suitable for formatting the result from execution of the tasks; and the command output module configured to format the result, wherein:

the configuration input includes a file having an indication of format for the result;

the result is formatted based on the indication of the format and based on the formats library; and the formatted result is compatible with one of displaying the formatted result on a viewscreen, exporting the formatted result into a data structure, exporting the formatted result into a software module, or using the formatted result in software.

* * * * *